US012673816B2

(12) United States Patent
Luxford

(10) Patent No.: US 12,673,816 B2
(45) Date of Patent: Jul. 7, 2026

(54) BIN SENSOR

(71) Applicant: XORRO PTY LTD, Mount Hawthorn (AU)

(72) Inventor: Len Luxford, Mount Hawthorn (AU)

(73) Assignee: XORRO PTY LTD, Mount Hawthorn (AU)

( * ) Notice: Subject to any disclaimer, the term of this patent is extended or adjusted under 35 U.S.C. 154(b) by 0 days.

(21) Appl. No.: 17/796,802

(22) PCT Filed: Feb. 1, 2021

(86) PCT No.: PCT/AU2021/050077
§ 371 (c)(1),
(2) Date: Aug. 1, 2022

(87) PCT Pub. No.: WO2021/151171
PCT Pub. Date: Aug. 5, 2021

(65) Prior Publication Data
US 2023/0048720 A1      Feb. 16, 2023

(30) Foreign Application Priority Data

Jan. 30, 2020    (AU) ................................. 2020900257

(51) Int. Cl.
*G01S 17/894*          (2020.01)
*B65F 1/16*          (2006.01)
(Continued)

(52) U.S. Cl.
CPC ................ *B65F 1/16* (2013.01); *G01F 23/20* (2013.01); *G01F 23/284* (2013.01); *G01F 23/292* (2013.01); *G01F 23/296* (2013.01);

*G01N 29/04* (2013.01); *G01P 15/18* (2013.01); *G01S 13/89* (2013.01); *G01S 17/894* (2020.01); *G05B 17/02* (2013.01); *G06Q 10/30* (2013.01);
(Continued)

(58) Field of Classification Search
CPC .... G01F 23/20; G01F 23/296; G01F 23/2928; G01F 23/26; G01F 23/284; G01F 23/292; G06Q 10/30; G06Q 10/0631; G06Q 10/087; G01N 29/04
See application file for complete search history.

(56) References Cited

U.S. PATENT DOCUMENTS

| | | | | |
|---|---|---|---|---|
| 10,169,980 | B1 * | 1/2019 | Baker | ................... G08B 21/182 |
| 2002/0108507 | A1 * | 8/2002 | May | ...................... B65F 1/1638 |
| | | | | 700/229 |

(Continued)

FOREIGN PATENT DOCUMENTS

| | | | | |
|---|---|---|---|---|
| DE | 102013209075 | A1 * | 11/2014 | ................. B65F 1/16 |
| EP | 2803953 | A1 | 1/2014 | |

(Continued)

OTHER PUBLICATIONS

English Translation of DE102013209075.*
(Continued)

*Primary Examiner* — Helen C Kwok
(74) *Attorney, Agent, or Firm* — Kim IP Law Group LLC

(57) ABSTRACT
A method comprises emitting detection radiation into a container; receiving a reflection of the emitted radiation from contents of the container; interpreting the received reflection to determine the contents of the container.

16 Claims, 6 Drawing Sheets

(51) Int. Cl.

| | | |
|---|---|---|
| *G01F 23/20* | (2006.01) | |
| *G01F 23/284* | (2006.01) | |
| *G01F 23/292* | (2006.01) | |
| *G01F 23/296* | (2022.01) | |
| *G01N 29/04* | (2006.01) | |
| *G01P 15/18* | (2013.01) | |
| *G01S 13/89* | (2006.01) | |
| *G05B 17/02* | (2006.01) | |
| *G06Q 10/30* | (2023.01) | |

(52) U.S. Cl.

CPC . *B65F 2210/128* (2013.01); *B65F 2210/1443* (2013.01); *B65F 2210/152* (2013.01); *B65F 2210/168* (2013.01); *B65F 2210/182* (2013.01); *B65F 2210/184* (2013.01); *B65F 2210/20* (2013.01)

(56) References Cited

U.S. PATENT DOCUMENTS

| | | | |
|---|---|---|---|
| 2008/0061977 A1* | 3/2008 | Maruca | G06Q 10/0637 |
| | | | 340/572.1 |
| 2009/0014363 A1* | 1/2009 | Gonen | G06Q 30/00 |
| | | | 700/89 |
| 2010/0025509 A1 | 2/2010 | Matlin et al. | |
| 2010/0102959 A1* | 4/2010 | Ashrafzadeh | G06Q 10/087 |
| | | | 340/540 |
| 2010/0106446 A1* | 4/2010 | Ashrafzadeh | G01F 23/2928 |
| | | | 702/116 |
| 2013/0155534 A1* | 6/2013 | Sala | B60R 1/072 |
| | | | 359/843 |
| 2013/0180892 A1* | 7/2013 | Marrapodi | B07C 5/34 |
| | | | 209/552 |
| 2014/0379588 A1* | 12/2014 | Gates | G06Q 10/30 |
| | | | 705/308 |
| 2015/0307273 A1* | 10/2015 | Lyman | G06Q 30/0623 |
| | | | 705/26.61 |
| 2015/0323366 A1* | 11/2015 | Kekalainen | G01F 17/00 |
| | | | 702/188 |
| 2019/0113927 A1* | 4/2019 | England | G06F 16/285 |
| 2019/0197498 A1 | 6/2019 | Gates et al. | |
| 2020/0010271 A1* | 1/2020 | Bourn | G06V 10/82 |
| 2020/0191580 A1* | 6/2020 | Christensen | G06Q 10/30 |
| 2022/0101279 A1* | 3/2022 | Anderson | G01S 7/521 |

FOREIGN PATENT DOCUMENTS

| | | |
|---|---|---|
| EP | 3415947 A1 | 12/2018 |
| WO | 2014063184 A1 | 5/2014 |
| WO | 2019040946 A1 | 2/2019 |

OTHER PUBLICATIONS

"Acconeer Annouces A121 Pulsed Coherent Radar Sensor, New High-Performance Product in A1 Family", Acconeer Press Release, Apr. 22, 2021.*

English Translation of DE102013209075 published on Nov. 20, 2014.*

International Search Report for International Application No. PCT/AU2021/050077 dated Apr. 12, 2021.

International Preliminary Report on Patentability for International Application No. PCT/AU2021/050077 dated May 26, 2022.

Written Opinion for International Application No. PCT/AU2021/050077 dated Apr. 12, 2021.

\* cited by examiner

16

30

10

12

40

14

20

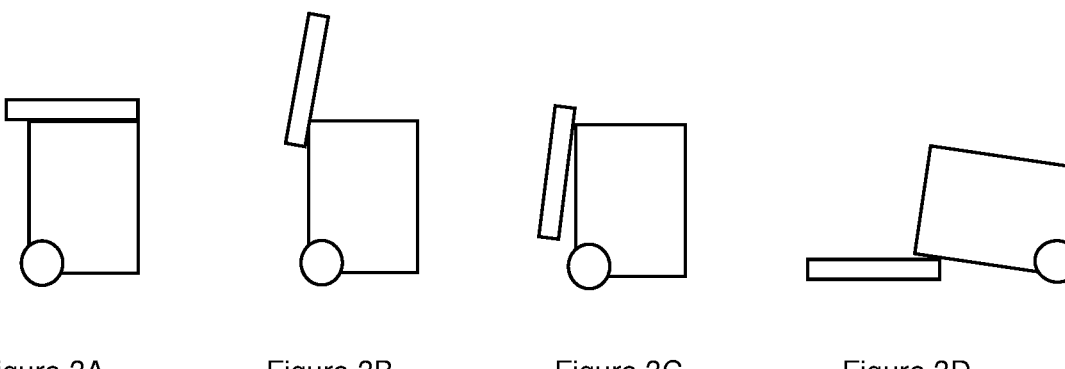
Figure 3A     Figure 3B     Figure 3C     Figure 3D
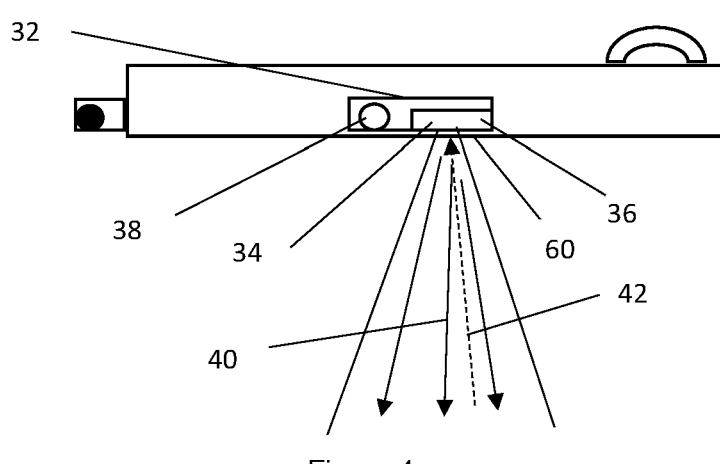
Figure 4
Figure 5
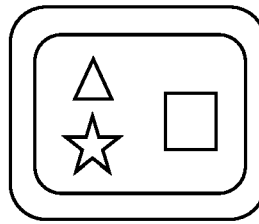
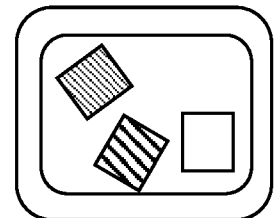
Figure 6A             Figure 6B

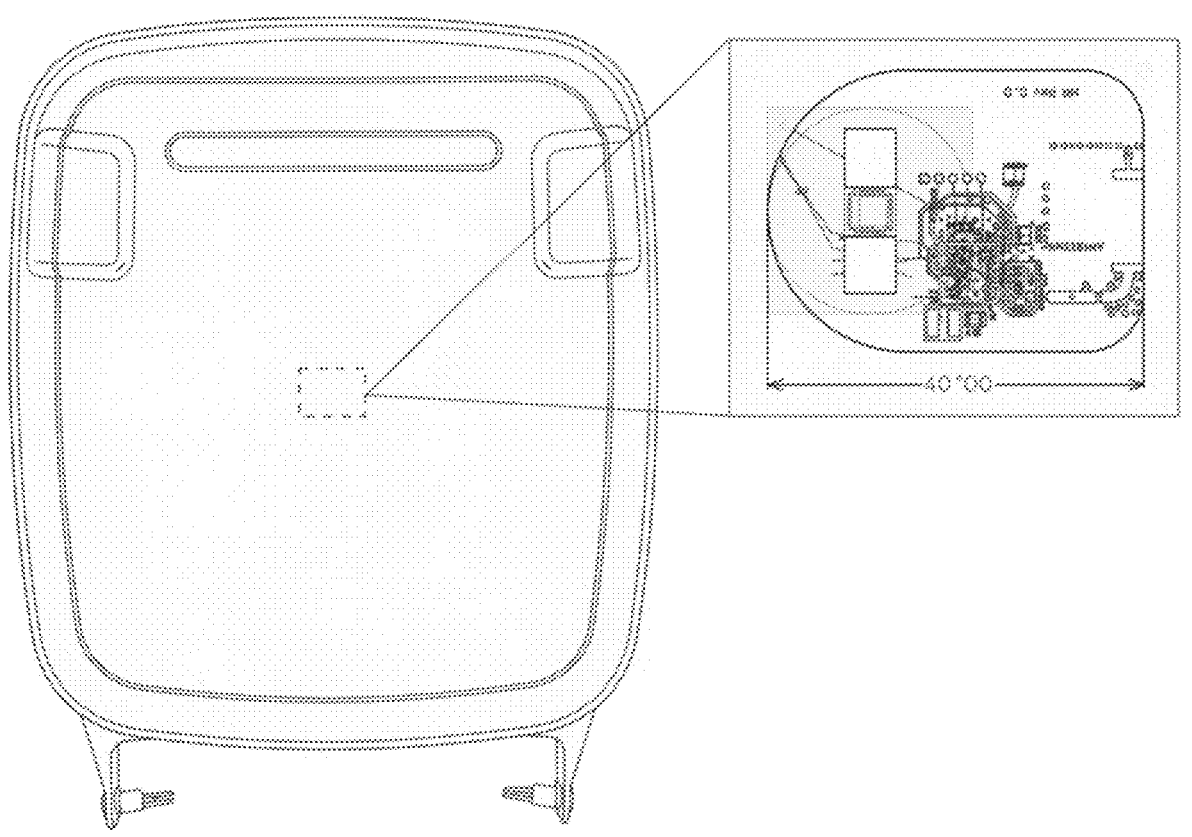
**Figure
7**

60

How much waste are you producing?
Bill period: 5 Nov     to 7 Feb     (95 days)
Compare with other homes in your area.
Average waste volume data supplied by Matter based on homes average waste usage from the EMRC.
Average daily cost and usage.
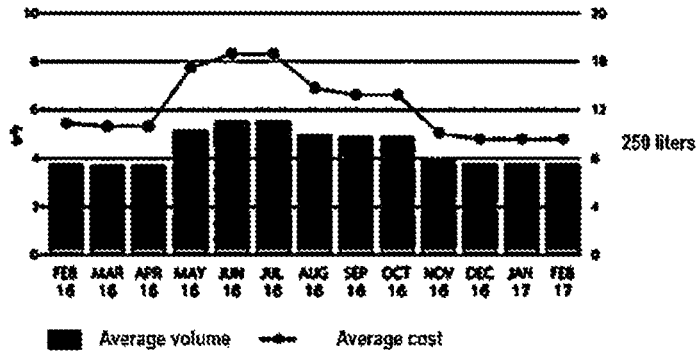
250 liters
■ Average volume  —◆—  Average cost
Snapshot.
Average weekly cost:
$3.77
Average weekly use:
9.61 Lt
Same time last year:
11.33 Lt
Figure 10

BIN SENSOR

CROSS-REFERENCE TO RELATED APPLICATIONS

This is a national stage application filed under 35 U.S.C. § 371 of International Patent Application No. PCT/AU2021/050077, filed Feb. 1, 2021, which claims priority to Australian Patent Application No. 2020900257 filed on Jan. 30, 2020, the disclosures of which are incorporated herein by reference in their entireties for all purposes.

FIELD OF THE INVENTION

The present invention relates to sensing of the contents of containers, such as bins.

BACKGROUND

There are existing sensing systems for sensing the contents of bin and for routing of collection therefrom. For example, the applicant's WO2014063184, the contents of which is incorporated herein by reference. Also, WO 2019/040946 and EP 3415947.

SUMMARY OF THE INVENTION

Systems and methods for monitoring, analysing, collecting and networking contents of containers are disclosed herein. A method for the analysis and comparison of contents of one or more household or public space containers is also disclosed.

According to an aspect of the present invention there is provided a sensor system for a container (such as a bin), the system comprising:

an emitter of a detection radiation into the container;

a receiver of reflected radiation arranged to produce a signal based on received reflected radiation, wherein the received reflected radiation is produced by reflection or similar of contents of the container;

a processor for interpreting the signal and preparing a transmission signal;

a transmitter of the transmission signal;

wherein the emitter, received, processor and transmitter are housed within a package that is integrally formed in a hinged lid of the container.

In an embodiment the system further comprises a power source for powering at least one of the emitter, receiver, processor and transmitter; wherein the power source is also housed in the package. The power source may be a battery, such as a long life lithium battery. Alternatively, the power source is mounted on an external face of the container body or lid. In this case the power source may comprise one or more solar cells.

In an embodiment the system further comprises another sensor for detecting a property of the lid. In an embodiment the property is acceleration and/or orientation and/or movement. In an embodiment the sensor comprises an accelerometer. In an embodiment the sensor creates a signal and the processor interprets the signal from the sensor. In an embodiment the interpretation comprises angle, whether the lid of open (vertical or nearly so), left open (flipped and vertical), closed (horizontal), or part open (at an angle to horizontal), whether the bin has been moved, whether the bin has been tipped or fallen over. Movement of the lid can be tracked and impacts of the lid (flipped over open) or bin (bin fallen) due to sudden change in acceleration can be determined. The angle or direction of movement can predict fall of a bin rather than opening of the lid as the movement of the lid is confined to a single rotational axis of movement, whereas movement outside of this confined range of movement may indicate the bin has fallen.

Acceleration over a short duration (open closing of the lid (say 10 second or so)) and over longer duration (use during a day or week) can be monitored and patterns recognised. Aberrations from the normal patterns can be detected and predictions made. Collective data from bin in the same area can be used to make predictions. Eg. a group of bins in a locality are all tipped over.

In an embodiment the package comprises a heat shield for shielding one or more of the emitter, receiver, processor, transmitter and power source from the heat of plastic moulding the package into the lid. In an embodiment the package in particular protect the battery from heat of moulding or forming the lid with the package integrally embedded therein. In an embodiment the package is in the form of a cassette.

In an embodiment the emitter looks through an aperture into the interior of the container. In one form the aperture may be a hole, on another form the aperture may be solid, but transparent to a type of radiation. In an alternative the emitter is covered by a layer of plastic of the lid and the emitter emits radiation that passes through the layer.

In an embodiment the system is not visible from the exterior of the container. In an embodiment the system is not visible from the interior of the container. In an embodiment the system is sealed in the lid of the container.

In an embodiment the emitter is capable of emitting radar and/or is capable of emitting a plurality of types of radiation one of which is laser for a LIDAR detector, ultrasonic, infrared light, xray, or microwave. In an embodiment the radiation is configured to scan the inside of the container to sense a surface defined by contents of the bin. In an embodiment the radiation is reflected and the reflection signal is processed to determine the level of contents in the container and/or the contents of the container (in terms of what the contents are). In an embodiment the scan is repeated over time so that the contents of the container as it is progressively filled can be determined.

In an embodiment the processor is configured to determine the characteristics of and/or the type of material inserted into the container. In an embodiment the emitted radiation is radar and the type of material is determined according to the reflection.

According to an aspect of the present invention there is provided a method comprising:

emitting detection radiation into a container from a lid of the container; receiving a reflection of the emitted radiation from contents of the container at a portion of the lid of the container;

interpreting the received reflection;

transmitting a signal representing the interpreted received reflection, wherein the emission and/or received refection is from behind a layer that covers an emitter and/or transmitter and the layer is transparent to the radiation.

In an embodiment the emission scans the contents of an area on the surface of the contents.

In an embodiment the interpretation is to determine either or both of the level of the contents in the container and the type of or characteristics of the contents of the container.

According to an aspect of the invention there is a device for fill volume detection comprising a package having a body within a lid hingedly attached to a container which receives contents within a void within the container; within the body: a first emitter for emitting a first sensing energy, a first detector for detecting a reflection of the first sensing energy, and a wireless transmitter for transmitting a signal based on the reflection.

According to an aspect of the present invention there is provided a sensor system for detection of waste levels in a bin, the system comprising:

an emitter of a radio frequency detection radiation into a container;

a receiver of reflected radio frequency radiation arranged to produce a signal based on received reflected radiation, wherein the received reflected radiation is produced by reflection or similar of contents of the container;

a processor for interpreting the signal.

In an embodiment the processor generates a transmission signal based on the interpreted reflection signal and a transmitter transmits the transmission signal.

In an embodiment the processor for interpreting the signal operates substantially as a radar processor. In an embodiment the emitter is a radar emitter. In an embodiment the receiver is a radar receiver.

In an embodiment system further comprises a power source for powering at least one of the emitter, receiver, processor and transmitter; wherein the power source, emitter, receiver, processor and transmitter are housed in a package. In an embodiment the package is formed inside a lid of the bin.

In an embodiment system further comprises another sensor for detecting a property of the lid.

In an embodiment the emitter emits the radiation through a layer that is transparent to the radio frequency emission.

In an embodiment system further comprises another emitter capable of emitting another type of radiation. In an embodiment the other types of radiation are selected from: laser for a LIDAR detector, ultrasonic, infrared light, xray, or microwave.

In an embodiment the radiation is configured to scan the inside of the container.

In an embodiment the processor is configured to determine the type of material inserted into the container.

The processor may determine the density of the material of a deposited article and/or the thickness and/or characteristic (spectral) reflective properties based on the received reflected radiation. From these the type of material can be inferred.

In an embodiment the scanning of the inside of the container is such that the shape of an article inserted can be determined. In an embodiment a dimension (such as the height, length, width) of the article that is within the container can be determined. In an embodiment the dimension and/or shape of the article and/or the type of material it is made of is used to determine a category type of the article. Eg a bottle or a can, or a pizza box.

In an embodiment the radar may be an Acconneer A111.

According to an aspect of the present invention there is provided a method comprising:

emitting radio frequency detection radiation into a container;

receiving a reflection of the emitted radiation from contents of the container; interpreting the received reflection;

transmitting a signal representing the interpreted received reflection.

The method can include determining a contents level of the contents in the container. The determining can include scanning the contents of an area on the surface of the contents.

In an embodiment the processor determines the contents level by determining a contour profile of the surface of the contents of the container. In an embodiment the processor determines the contents of the container by detecting the type of material of an article inserted/deposited into the container.

In an embodiment the method comprises aggregating of a plurality of the reflections of scans/sweeps and determining the density and or thickness of the material in the container that allows for internal cavity of the container and material measurement.

In an embodiment the material measurement comprises time of drop (also known as time of flight (ToF)).

In an embodiment the material measurement comprises shape of article determination.

In an embodiment the processor sends determinations as to fill level and/or contents (material type and/or article type) and/or events to a server.

In an embodiment the emitter is housed within the lid ie embedded within rather than attached to the bin lid. This would typically mean housing the associated electronics including the transmitter within a watertight, sealed, radio transparent material such as plastic.

According to an aspect of the present invention there is provided a sensor system for determination of content in a bin, the system comprising:

an emitter of a detection radiation into a container;

a receiver of reflected radiation arranged to produce a signal based on received reflected radiation, wherein the received reflected radiation is produced by reflection or similar of contents of the container;

a processor for interpreting the signal to determine contents of the bin.

In an embodiment the system further comprises a transmitter for transmitting a representation of the interpretation.

In an embodiment the emitter is capable of emitting radar. In an embodiment the emitter is capable of emitting a laser beam for a LIDAR detector. In an embodiment the emitter is capable of emitting a plurality of types of radiation. For example, ultrasonic, infrared light, radar, laser, xray, microwave. In an embodiment the radiation is configured to scan the inside of the container. In an embodiment the radiation is reflected and the reflection signal is processed to determine the type or types of contents in the container. In an embodiment the scanning is repeated over time so that the type of contents of the container is progressively determined.

In an embodiment the processor is configured to determine the type of material inserted into the container. In an embodiment the emitted radiation is radar and the type of material is determined according to the reflection.

The radiation may determine the density of the material of a deposited article and/or the thickness and/or characteristic (spectral) reflective properties. From these the type of material can be inferred.

In an embodiment the scanning of the inside of the container is such that the shape of an article inserted can be determined. In an embodiment a dimension (such as height, length or width) of the article in the container can be determined. In an embodiment the shape of the article and the type of material it is made of is used to determine a category type of the article. Eg a bottle or a can, or a pizza box.

In an embodiment the container may be designated to contain certain types of material. Eg recyclables, glass, cardboard/paper, metal, green waste, organic matter, household waste. In an embodiment the processor is configured to determine whether the types of material inserted into the container are of the designated type or not. Thus, contamination can be detected.

Various types of radiation are better or worse at detecting different type of material. Different type of radiation can be produced by the emitted so that a radiation type better for one type of material can be used to detect material that another type of radiation is worse at detecting.

In an embodiment the processor cooperates with a networked processor to share processing.

In an embodiment the processor employs a model. In an embodiment the model is used determine characteristic of the article or the material that the article is made of.

In an embodiment the model uses information on the material of each article and/or the article type and/or the time of deposit of the article into the container and/or event occurring to other containers to determine or assist in determining the contents inserted into the container. Eg insertion of an article of a certain type, insertion of an incorrect article, opening closing the lid at dinner time and insertion of food scapes, a group of bins being blow over by a storm.

In an embodiment the processor receives a location signal, such as GPS.

In an embodiment the model employs a learning/artificial intelligence (AI) algorithm. In an embodiment the model applies data available to it to decide what is being inserted into the container.

According to an aspect of the present invention there is provided a method comprising:

emitting detection radiation into a container;

receiving a reflection of the emitted radiation from contents of the container;

interpreting the received reflection to determine the contents of the container.

In an embodiment the method further comprises transmitting a signal representing the interpreted received reflection.

The method can include determining a contents level of the contents in the container. The determining can include scanning the contents of an area on the surface of the contents.

In an embodiment the processor determines the contents level by determining a contour profile of the surface of the contents of the container. In an embodiment the processor determines the contents of the container by detecting the type of material of an article inserted/deposited into the container.

In an embodiment the method comprises aggregating of a plurality of the reflections of scans/sweeps and determining the density and or thickness of the material in the container that allows for internal cavity of the container and material measurement.

In an embodiment the material measurement comprises radar sensing.

In an embodiment the material measurement comprises time of drop (also known as time of flight (ToF)).

In an embodiment the material measurement comprises shape of article determination.

In an embodiment the processor sends determinations as to fill level and/or contents (material type and/or article type) and/or events to a server.

In an embodiment the server shares determinations with other processors of other containers and/or is configured to make collective determinations about groups of containers. In an embodiment this is facilitated by each container being uniquely identified. In an embodiment this is facilitated by each container's location being known. In an embodiment this is facilitated by each event having a time stamp recorded against it.

The method can include calculation by the server system whether to include the container in a route data set defining a route. The calculation is determined according to the determined content of the container.

The method can include combining the topology with the density to infer a type of material.

According to an aspect of the present invention there is provided a sensor system for waste containers, the system comprising:

an emitter of a detection radiation into a container;

a receiver of reflected radiation arranged to produce a signal based on received reflected radiation, wherein the received reflected radiation is produced by reflection or similar of contents of the container;

a processor for interpreting the signal;

a processor for using a model or similar to determine an event has occurred in relation to the container.

In an embodiment the radiation is configured to scan the inside of the container. In an embodiment the radiation is reflected and the reflection signal is processed to determine information to be input into the model.

In an embodiment the model is configured to determine the type of material inserted into the container.

In an embodiment the model is configured to determine the density of the material of a deposited article and/or the thickness and/or characteristic (spectral) reflective properties.

In an embodiment the model determined the type of material deposited into the container. Eg recyclables, glass, cardboard/paper, metal, green waste, organic matter, household waste.

In an embodiment the model is used determine characteristic of the article or the material that the article is made of. In an embodiment the model is a behavioural model. In an embodiment the model used time (timing and/or duration and/or time of day) to determine events.

In an embodiment the system comprises a further sensor and the model is able to determine one or more of the following based on input from the further sensor: whether the lid has been left open, whether the bin has been moved to an irregular location, whether the bin has been tipped or fallen over.

In an embodiment the processor cooperates with a networked processor to share processing.

In an embodiment the model uses information on the material of each article and/or the article type and/or the time of deposit of the article into the container and/or event occurring to other containers to determine or assist in determining the type of event occurring or more details of the event occurring on/in/to the container. Eg insertion of an article of a certain type, insertion of an incorrect article, opening closing the lid at dinner time and insertion of food scapes, a group of bins being blow over by a storm.

In an embodiment the processor receives a location signal, such as GPS.

Further sensors may be employed to detect properties of the surrounds of the container and make data reflecting that available to the processor/model.

In an embodiment the model employs a learning/artificial intelligence (AI) algorithm. In an embodiment the model applies data available to it to decide what is being inserted into the container or other event occurring to the container and whether to do something about that event. For example, a signal for emptying of the container, that the container needs service/repair.

In an embodiment the AI algorithm is trained using external data. Eg weather data, security camera footage, electricity consumption, water consumption, collected rubbish content, content weight, moisture content of contents, energy created by combustion, carbon credits.

The AI algorithm may learn household waste disposal habits, street rubbish disposal habits, event disposal habits etc.

According to an aspect of the present invention there is provided a method comprising:

emitting detection radiation into a container;
 receiving a reflection of the emitted radiation from contents of the container; interpreting the received reflection using a model;
 transmitting a signal representing the interpreted received reflection.

In an embodiment the model is based on learning repeated behaviours and identifying unusual behaviours.

In an embodiment the model determines the contents level by determining a contour profile of the surface of the contents of the container. In an embodiment the model determines the contents of the container by detecting the type of material of an article inserted/deposited into the container.

In an embodiment the method comprises aggregating of a plurality of the reflections of scans/sweeps made over time and the model determining the density and or thickness of the material in the container that allows for internal cavity of the container and material measurement.

In an embodiment the material measurement comprises radar sensing.

In an embodiment the material measurement comprises time of drop (also known as time of flight (ToF)).

In an embodiment the material measurement comprises shape of article determination.

In an embodiment the processor sends determinations as to fill level and/or contents (material type and/or article type) and/or events to a server.

In an embodiment the server shares determinations with other processors of other containers and/or is configured to make collective determinations about groups of containers. In an embodiment this is facilitated by each container being uniquely identified. In an embodiment this is facilitated by each container's location being known. In an embodiment this is facilitated by each event having a time stamp recorded against it.

The method can include calculation by the server system whether to include the container in a route data set defining a route. The route can have stops at one or more of the containers.

The method can include creating the route data set and wirelessly sending the route data set from the server system to a mobile device.

The method can include collection along the route with the use of automated vehicles including self-driving vehicles. The mobile device can be in communication with a navigation system of the self-driving vehicle connected to a server for 'just in time' updates.

The system can have multiple types of sensors. One modality of sensor can be used with other types or modalities of sensors, for example, to establish fill levels and fill topology. For example, TOF sensors and weight sensors can be used together to calculate a volume and weight of the contents.

DESCRIPTION OF DRAWINGS

FIG. 3A is a schematic representation showing a first position of a lid of a container in a closed position.

FIG. 3B is a schematic representation showing a first position of a lid of a container in a first open position.

FIG. 3C is a schematic representation showing a first position of a lid of a container in a second open position.

FIG. 3D is a schematic representation showing a bin tipped over with a lid in the an open position.

FIG. 4 is a schematic vertical cross-section through a side elevation of a lid of a container according to an embodiment of the present invention.

FIG. 5 is a schematic plan view of a lid according to an embodiment of the present invention.

FIG. 6A is a schematic perspective view of an inside of a bin with different shaped contents inside.

FIG. 6B is a schematic perspective view of an inside of a bin with different densities of contents, or contents forms of different materials) inside.

FIG. 7 shows a system according to an embodiment comprising PCB with an emitter, receiver processor and transmitted on board and an example placement in a lid of a 'council wheelie bin'.

FIG. 10 shows an example display of household rubbish produced by collected waste bin contents/fill level data and processing over time. Further, collections from multiple bins can be aggregated and compared.

DESCRIPTION OF EMBODIMENTS

Figure 1:
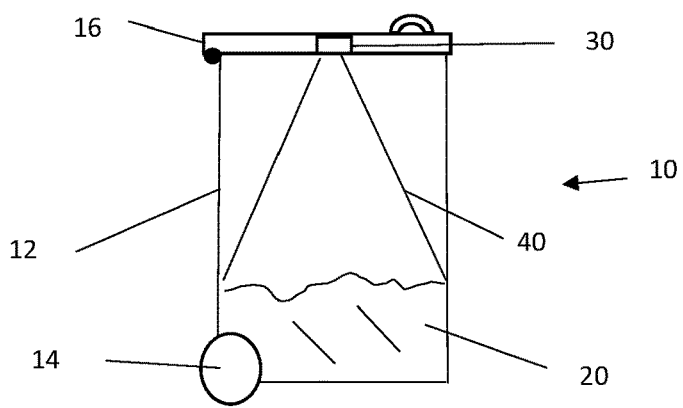
FIG. 1 is a schematic vertical cross-section through a side elevation of a container in the form of a wheeled bin having a system according to an embodiment of the present invention.
Figure 2:
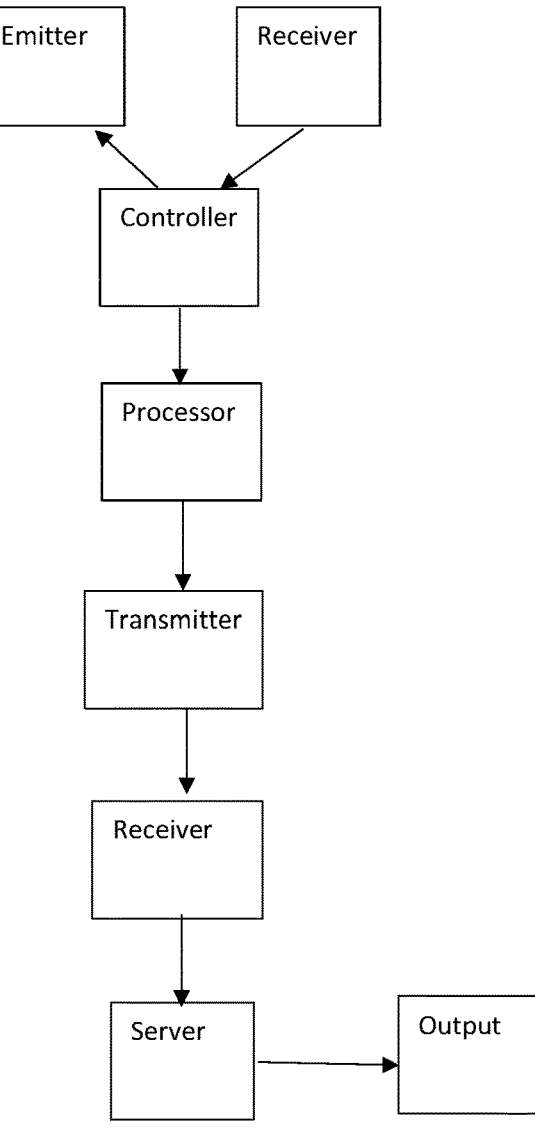
FIG. 2 is a block diagram of a system according to an embodiment of the present invention.
Figure 8:
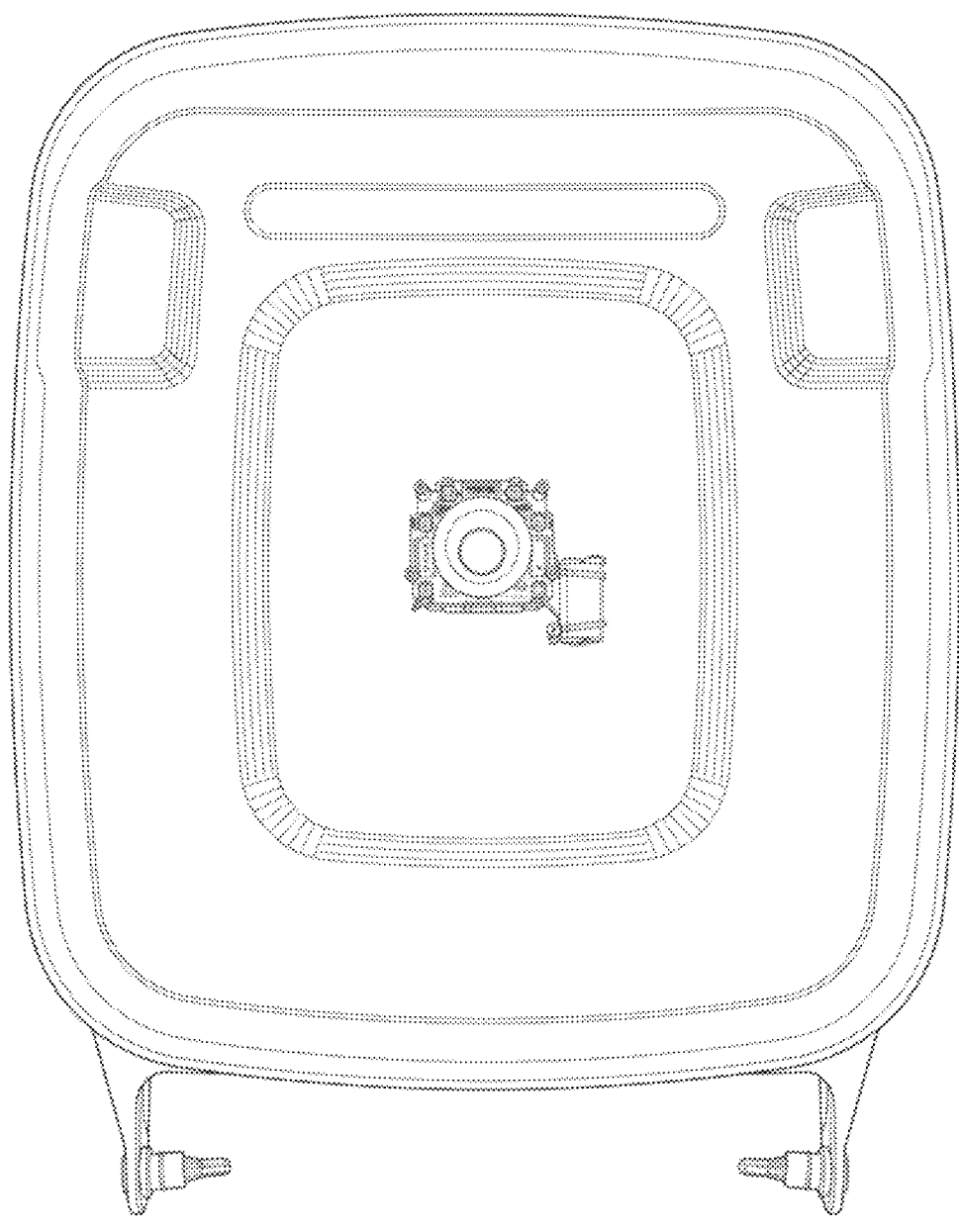
FIG. 8 shows the PCB of FIG. 7 before embedding in the lid.

Referring to FIGS. 1, 2 and 4 there is a container, such as a wheeled bin, having a body 12 of the container 10, wheels 14 and a hinged lid 16. The container has contents 20. A device 30 for analysing the contents 20 comprises:

an emitter of a detection radiation 40 into a container 10;
 a receiver of reflected radiation 42 arranged to produce a signal based on received reflected radiation, wherein the received reflected radiation is produced by reflection or similar of contents of the container;
 a processor for interpreting the signal and preparing a transmission signal;
 a transmitter of the transmission signal.

The emitter and receiver operate under the control of a controller. The controller may be part of the processor. In a system there is also a receiver which receives the transmission signal, a server which uses the signal and the server has an output.

In an embodiment the emitter, receiver and controller are formed into a single package. In an embodiment the system further comprises a power source for powering at least one of the emitter, receiver, processor and transmitter.

In an embodiment the system further comprises a package 32 for housing the emitter, receiver, processor, transmitter and power source.

In an embodiment the package is integrally formed with, in or on a portion of the container. In an embodiment the portion is a lid 16 of the container. In an embodiment the package is not attached to the container (and in particular the lid) by screws or glue.

In an embodiment the system further comprises another sensor for detecting a property of the portion. In an embodiment the property is acceleration and/or orientation and/or movement. In an embodiment the sensor comprises an accelerometer. In an embodiment the sensor creates a signal and the processor interprets the signal from the sensor. In an embodiment the interpretation comprises angle, whether the lid of open (vertical or nearly so as per FIG. 3B), left open (flipped and vertical as per FIG. 3C), closed (horizontal as per FIG. 3A), or part open (at an angle to horizontal), whether the bin has been moved, whether the bin has been tipped or fallen over as per FIG. 3D. Movement of the lid can be tracked and impacts of the lid (flipped over open) or bin (bin fallen) due to sudden changed in acceleration can be determined. The angle or direction of movement can predict fall of a bin rather than opening of the lid as the movement of the lid is confined to a single rotational axis of movement, whereas movement outside of this confined range of movement may indicate the bin has fallen.

Acceleration over a short duration (open closing of the lid (say 10 second or so)) and over longer duration (use during a day or week) can be monitored and patterns recognised. Aberrations from the normal patterns can be detected and predictions made. Collective data from bin in the same area can be used to make predictions. Eg. a group of bins in a locality are all tipped over.

In an embodiment the package comprises a heat shield for shielding one or more of the emitter, receiver, processor, transmitter and power source from the heat of plastic moulding the package into the portion of the container. In an embodiment the package in particular protect the battery 38 from heat of moulding or forming the lid with the package integrally embedded therein. In an embodiment the package 32 is in the form of a cassette.

In an embodiment the emitter looks through an aperture into the interior of the container. In one form the aperture may be a hole, on another form the aperture may be solid, but transparent to a type of radiation (eg transparent glass or plastic for light, or plastic for radio frequency). In an alternative the emitter is covered by a layer 60 of the portion.

Figure 9:
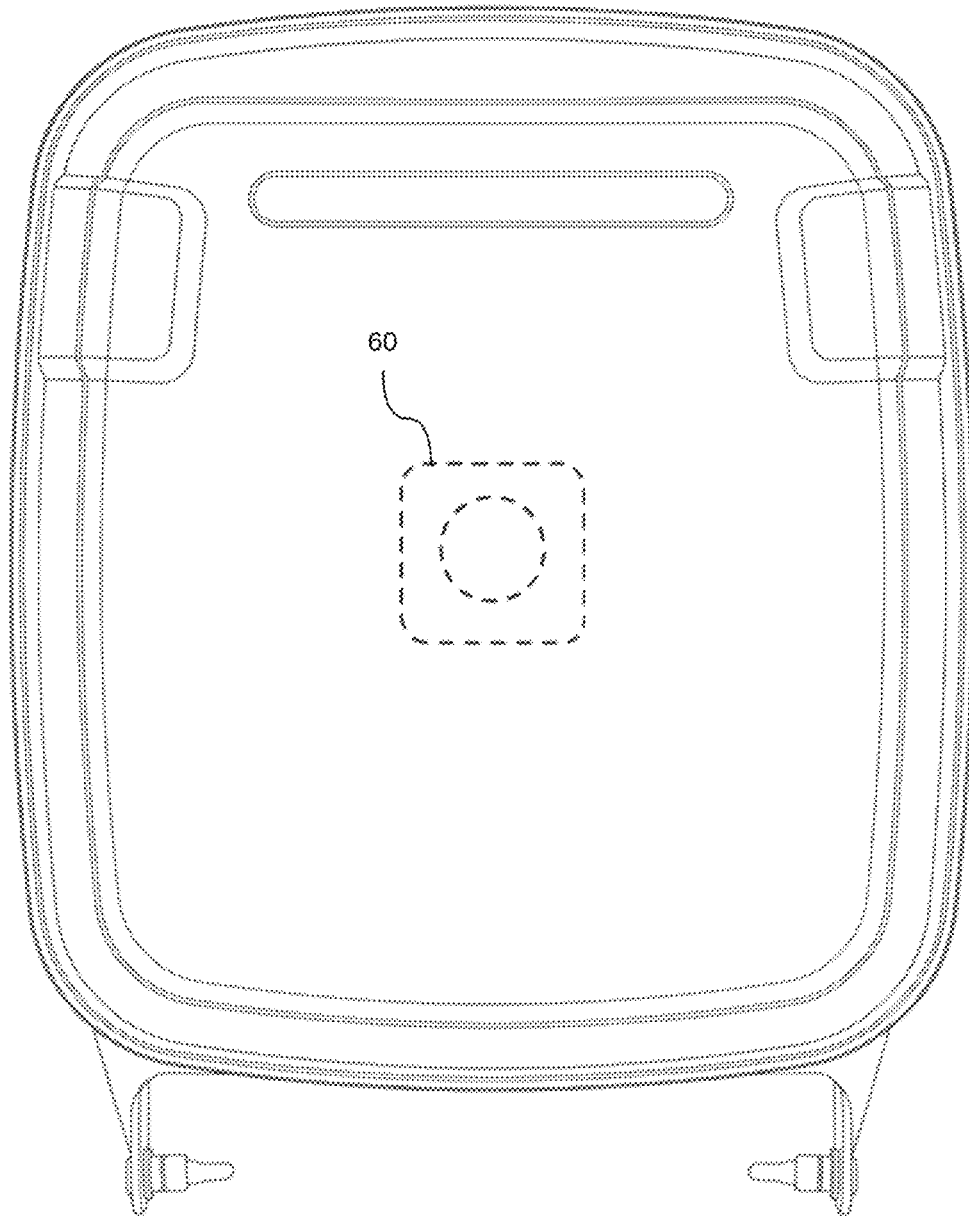
FIG. 9 shows the PCB schematically embedded in the lid.

In an embodiment the system is not visible from the exterior of the container (as per FIG. 9). In an embodiment the system is not visible from the interior of the container. In an embodiment the system is sealed in the lid of the container.

In an embodiment the emitter is capable of emitting a plurality of types of radiation. For example, ultrasonic, infrared light, radar, laser, xray, microwave. In an embodiment the radiation is configured to scan the inside of the container. In an embodiment the radiation is reflected and the reflection signal is processed to determine the level of contents in the container and/or the contents of the container. In an embodiment the scan occurs over time so that the contents of the container as it is progressively filled can be determined.

In an embodiment the processor is configured to determine the type of material inserted into the container. In an embodiment the emitted radiation is radar and the type of material is determined according to the reflection.

The radiation may determine the density of the material of a deposited article and/or the thickness and/or characteristic (spectral) reflective properties as per FIG. 6B. From these the type of material can be inferred.

In an embodiment the scanning of the inside of the container is such that the shape of an article inserted can be determined. In an embodiment a dimension or shape of the article in the container can be determined as per FIG. 6A. In an embodiment the shape of the article and the type of material it is made of is used to determine a category type of the article. Eg a bottle or a can, or a pizza box.

In an embodiment the container may be designated to contain certain types of material. Eg recyclables, glass, cardboard/paper, metal, green waste, organic matter, household waste.

In an embodiment the processor is configured to determine whether the types of material inserted into the container are of the designated type or not. Thus, contamination can be detected.

Various types of radiation are better or worse at detecting different type of material. Different types of radiation can be produced by the emitter so that a radiation type better for one type of material can be used to detect material that another type of radiation is worse at detecting.

In an embodiment the processor cooperates with a networked processor to share processing.

In an embodiment the processor employs a model. In an embodiment the model is used determine characteristic of the article or the material that the article is made of. In an embodiment the model is a behavioural model. In an embodiment the model used time (timing and/or duration and/or time of day) to determine events.

In an embodiment the model uses information on the material of each article and/or the article type and/or the time of deposit of the article into the container and/or event occurring to other containers to determine or assist in determining the type of event occurring or more details of the event occurring on/in/to the container. Eg insertion of an article of a certain type, insertion of an incorrect article, opening closing the lid at dinner time and insertion of food scapes, a group of bins being blow over by a storm.

In an embodiment the processor receives a location signal, such as GPS.

Further sensors may be employed to detect properties of the surrounds of the container and make data reflecting that available to the processor/model.

In an embodiment the model employs a learning/artificial intelligence (AI) algorithm. In an embodiment the model applies data available to it to decide what is being inserted into the container or other event occurring to the container and whether to do something about that event. For example, a signal for emptying of the container, that the container needs service/repair.

In an embodiment the AI algorithm is trained using external data. Eg weather data, security camera footage, electricity consumption, water consumption, collected rubbish content, content weight, moisture content of contents, energy created by combustion, carbon credits.

The AI algorithm may learn household waste disposal habits, street rubbish disposal habits, event disposal habits etc.

The system may work similarly to that of WO2014063184 but with additional or alternative sensors as described herein. The routing of a waste collector or a maintenance person may work similarly to that of WO2014063184 but with determinations and/or decisions about the contents or state of the container or events occurring to/in/on or around the container as described herein. Equally WO2019/040946 or EP 3415947 (the contents of which are incorporated here by reference) individually in place of WO201403184 or collectively with each other and/or with WO201403184.

In an embodiment the radar may be an Acconneer A111. The A111 is an optimized low-power, high-precision, 60 GHz radar sensor with integrated Baseband, an RF front-end and an Antenna in Package (AIP). The sensor is based on pulsed coherent radar (PCR) technology with picosecond time resolution. The A111 is a high accuracy, high-resolution sensing system with low-power consumption. The A111 Pulsed Coherent Radar (PCR) Datasheet, v2.1 is incorporated herein by reference.

According to an aspect of the present invention there is provided a method comprising:

emitting detection radiation into a container;

receiving a reflection of the emitted radiation from contents of the container; interpreting the received reflection;

transmitting a signal representing the interpreted received reflection.

A method for the analysis and comparison of contents of one or more household or public space containers with virtual networking is also disclosed.

The method can include determining a contents level of the contents in one of the containers. The determining can include scanning the contents of an area on the surface of the contents. A comparative display such as shown in FIG. 10 can be produced and made available via a website and/or Application software.

In an embodiment the scan is conducted by use of the emitter described above.

In an embodiment the processor determines the contents level by determining a contour profile of the surface of the contents of the container. In an embodiment the processor determines the contents of the container by detecting the type of material of an article inserted/deposited into the container.

In an embodiment the method comprises aggregating of a plurality of the reflections of scans/sweeps and determining the density and or thickness of the material in the container that allows for internal cavity of the container and material measurement.

In an embodiment the material measurement comprises radar sensing.

In an embodiment the material measurement comprises time of drop (also known as time of flight (ToF)).

In an embodiment the material measurement comprises shape of article determination.

In an embodiment the processor sends determinations as to fill level and/or contents (material type and/or article type) and/or events to a server.

In an embodiment the server shares determinations with other processors of other containers and/or is configured to make collective determinations about groups of containers. In an embodiment this is facilitated by each container being uniquely identified. In an embodiment this is facilitated by each container's location being known. In an embodiment this is facilitated by each event having a time stamp recorded against it.

In an embodiment the emitter is housed within the lid ie embedded within rather than attached to the bin lid. This would typically mean housing the associated electronics including the transmitter within a watertight, sealed, radio transparent material such as plastic.

In an alternative of a bin without a lid, package housing the electronics including the emitter is within the walls of the bin or in the bin base, with or without the sensor, using a watertight, sealed, radio transparent material such as plastic.

The method can include calculation by the server system whether to include the container in a route data set defining a route. The route can have stops at one or more of the containers.

The method can include creating the route data set and wirelessly sending the route data set from the server system to a mobile device.

The method can include collection along the route with the use of automated vehicles including self-driving vehicles. The mobile device can be in communication with a navigation system of the self-driving vehicle connected to a server for 'just in time' updates.

A system for the collection of contents of one or more geographically distributed containers is disclosed. These containers can include both public and private containers (such as domestic wheeled bins). The system can have one or more endpoints for the collected information which may include app notification to the householder. The system can have a server or 'cloud' system in wireless communication with the container's one processor. The processor can transmit data to the home, office and the local waste collecting authority or contractor. The data can include data representing a fill level of the contents in the container or many containers at one location.

These containers may be sorted in accordance with local waste streams including dedicated streams for: paper/cardboard, glass, organics (food and/or garden refuse), metal and general waste. The system may also sense cross contamination of these materials in the one container. Metal might give a very strong reflection signal in the scan envelope while paper & cardboard might give a good signal based on density readings and envelope sweeps. Food waste, meanwhile, might be measured for irregular densities indicating purity issues that might be captured by radar, ToF or other sensing. Envelope sweeps might be interpreted via artificial intelligence/machine learning and image recognition tools. Envelope sweeps might be short and long range and cover the full surface and depth of a controlled space (e.g. the inside of the bin).

The system may provide the household or office with data related to a comparison of waste streams. The system may also compare a household's waste streams against other local, regional and national measures. These area's might be as defined in ISO/FDIS 37105 Sustainable cities and communities—Descriptive framework for cities and communities.

Visualisation of these geographic differences for the home or office might be made through various devices including smart home dashboards and mobile device applications.

The container can have a lid. A first sensor of the one or more sensors can be embedded in the lid or body of the container. The first sensor can be a radar sensor. The first sensor can emit a first sensing energy. The radar might be a model such as the Acconneer A111.

The second or more sensors can be embedded in the lid or the body of the container. The second sensor can be embedded in the lid along with the first sensor. The second sensor can emit a second energy that can include a radar capable of envelope sweeps.

The first sensor can be spaced at a distance from the second sensor and can be used to provide perspective/3D scanning. The second sensor can be embedded or externally attached to a wall or body of the container.

The first and/or second sensor can be built into a cassette that can be retrofitted to existing wheeled bins. This can be a self-contained unit that can be permanently attached or semi permanently attached by means of glue, or welded by ultrasonics, or heat or by other means to the existing bin lid. This could contain all or part of the electronics for the transmission, receipt and communication thus described.

The first sensor can have a first emitter for emitting a first sensing radiation and a second emitter for emitting a second sensing radiation. The first emitter can be directed to a first point/area on the surface of the contents. The second emitter can be directed to a second point/area on the surface of the contents or directed to the density of the contents.

A device for fill volume and density detection is disclosed. The device can have a package having a body and a lid hingedly attached to the body. The container can contain contents filling a void within the container. The first sensor can have a first emitter for emitting a first sensing energy, a first detector for detecting a reflection of the first sensing energy, and a first wireless radio. The first emitter can be directed so the first sensing energy is emitted in the direction of the surface of the contents.

The device can have a second sensor having a second emitter for emitting a second sensing energy, a second detector for detecting a reflection of the second sensing energy, and a second wireless radio.

The first sensor can have a second emitter for emitting a second sensing energy, and a second detector for detecting a reflection of the second sensing energy. The first emitter can be directed to a first point/area on the surface of the contents. The second emitter can be directed to a second point/ear or the first point on the surface of the contents.

A method for fill volume detection is disclosed. The method can include emitting a sensing radiation from an emitter in a container. The container can contain contents defining the fill volume (void) within the container. The emitting can include directing the sensing energy to multiple points on the surface of the contents. The method can include detecting reflections of the sensing energy off of the multiple points of the surface of the contents. The method can include tracking the amount of time elapsed between the emitting of the sensing energy and the detecting of the reflections of the sensing energy. The method can include calculating a length associated with the amount of time for reflections of the sensing energy for each of the multiple points. The method can include forming a topography of the surface of the contents. The forming can include utilising the calculated lengths to form the topography.

The method can include combining the topology with the density to infer a type of material.

The method can include calculating the fill volume by at least processing the topography.

The container can have a body and a lid hingedly attached to the body.

The emitting can include emitting from a first sensor in the container. The first sensor can have a first emitter for emitting the first sensing energy, a first detector for the detecting a reflection of the first sensing energy, and a first wireless radio.

Multiple sensors can be used per container. For example, multiple time of flight (TOF) cameras can be used to measure the content of a container. The resolution of the calculation of the fill level and topography of the surface of the contents can increase with the more emitters and detectors or sensors for the given container. The algorithms for combining the sensors can use simple image stitching, or voting algorithms to establish conditions where some or all of the sensors are reporting fill levels.

The system can estimate the fill level of containers where the contents have an irregular shape (e.g., solids, garbage bags, cardboard boxes). The system, for example via a multi-point TOF sensors, can estimate the volume of the contents if the contents are evenly distributed across the container or gathered at one side.

The system can have multiple types of sensors. One modality of sensor can be used with other types or modalities of sensors, for example, to establish fill levels and fill topology. For example, TOF sensors and weight sensors can be used together to calculate a volume and weight of the contents.

The system can sense the temperature of each container. A cluster of containers might give aggregated trend data over a given locality. A singular container might provide alerts in real time if the container exceeds a threshold temperature. This temperature alert might provide a warning as to a potential fire within the container. The threshold level for the alert might also work to trigger decomposition sensors such as humidity, gas, pH or VOC detectors, or combinations thereof, on the PCB. These sensors could also be used to sense contamination within the container or a waste stream form one or more containers.

The sensor can have an accelerometer installed in the lid. The accelerometer can work via the PCB and the communication module to record opening events. It can gather these events in a memory and then send the data packets to indicate the visitations to the site and the necessity of the site's placement.

The accelerometer can work via the PCB and the communication module to record overflow events and to measure/calculate the number of bin visits. This condition can be indicated if the bin lid sits at a position between a 90 degree arc as defined. This condition might also be reported via an app or tablet device to a householder/office worker to indicate that a bin has been emptied and can be retrieved. These conditions and general status updates might be reported to the home or office occupant.

The accelerometer can also work across an array of bins to indicate such things as high wind events in the area. This condition might be reported via an app or tablet device to workers and/or visitors to an area such as a park. These conditions and general status updates might be reported to a contractor or council worker with the use of in-vehicle technology.

The sensor can have a GPS sensor. The GPS sensor can determine the containers location. The location can be stored in a memory on the sensor and/or reported to the server. For example, the sensor can report its location to emergency services if moved to a location—pre-determined or otherwise—during extreme weather events such as bushfires. This could indicate the presence of people in otherwise isolated regional households.

The circuit board can have one or more wireless communication antennas, for example Bluetooth, wi-fi, cellular (e.g., PCS, GSM, 2G, 3G, 4G, CAT-M1, NB-IoT), or LoRa antennas, or combinations thereof. The circuit board can have a fixed or replaceable SIM card. The communications can be linked to satellite support as needed.

The PCB can turn on the radar to measure the fill level of the container at specified intervals. For example, the sensor can measure the fill level at an hourly interval set by the server system and stored in a memory in the sensor. When not measuring the fill level, the sensor can operate in a low power mode to conserve energy. The radar can also be turned on for a period after each bin lid closure.

The fill level detected by the sensor can be dependent on placement of the device in the container, including the distance between the device and the bottom of the container and the orientation of the device with respect to the container. The server system and/or sensor can calibrate the sensor to compensate for the placement of the sensor within the container and the orientation of the container. For example, a baseline fill level reading can be transmitted to the server system when the sensor is first installed on an empty container. Future measurements received from the sensor can be compared to the baseline. If the topology is regularly at an angle to horizontal it might be inferred that the bin is placed on sloped ground and can compensate measurements accordingly.

Dimensions of the container can be manually or automatically entered at the server system (e.g., wirelessly via a device and an app) and compared to measurements taken by the sensor. The server system can perform the calibration or compensation, or can transmit parameters (e.g., a baseline fill level) to the sensor for calibration, or the sensor can store the parameters and perform the calibration without interacting with the server system. The sensor can be provisioned by the use of a magnet that prompts the PCB into an awake mode.

The server system can generate a schedule for an individual containers to be emptied, based on the fill level of the containers. The server system can add the container to an existing schedule when the container reaches a threshold fill level. The schedule to which the container is added can be based on location of the container (e.g., add the container to an operators route or schedule with nearby containers), on other business logic rules such as timing for when an operator can be dispatched to the full container, or combinations thereof. If an operator is currently dispatched to empty containers in the region of a full container, the server system can dynamically modify the operators pick-up schedule and route to add the newly reported full (or nearing full) container.

The server system can predict when a container will be full by applying a regression model or machine learning/artificial intelligence to fill level data received from the sensor. For example, the server system can determine that a garbage truck scheduled to pass by a garbage container should empty the garbage container, even though the garbage container may be less than a threshold fill level, because the container will likely be overflowing before the next time the garbage truck is scheduled to pass the container.

The server system can transmit software updates as well as preset parameters to the sensor. For example, the server system can transmit a threshold fill level to the sensor, and can define an interval of time for measuring the fill level of the container. Firmware updates received by the sensor can be authenticated to the server system, for example, to reduce the likelihood of unauthorized third parties uploading their own code or configurations to the sensor.

Fill levels for a container can be tracked over time (e.g., by a clock or time sensor on the sensor or server system). By comparing the measured fill levels to threshold fill levels, the server system can predict when a container needs to be serviced.

The bin lids and bin types can include but are not limited to 7 lt, 80 lt, 120 lt, 140 lt, 240, lt, 360l, 600 lt and 1100 lt capacities and all permutations within and beyond.

The processor may be a microprocessor controlled by one or more computer programs, which comprise instructions stored in a non-volatile manner (eg in firmware or solid state storage) which when executed cause the processor to operate according to one or more of the embodiments as described herein.

The power source may be a battery, such as a long life lithium battery. The power source may comprise one or more solar cells as per FIG. 5.

Modifications and variations as would be apparent to a skilled person are intended to be covered by the present invention.

What is claimed is:

1. A sensor system for a container, the system comprising:
an emitter of a detection radiation into the container;
a receiver of reflected radiation arranged to produce a signal based on received reflected radiation, wherein the received reflected radiation is produced by reflection of contents of the container;
a processor for interpreting the signal and preparing a transmission signal;
a transmitter of the transmission signal;
wherein the emitter, the receiver, the processor and the transmitter are housed within a package that is integrally formed in a moulded plastic hinged lid of the container, with a layer of plastic covering the emitter and receiver, wherein the emitter emits radiation that passes through the layer of plastic, wherein the layer of plastic covering the emitter and the receiver is formed during moulding of the moulded plastic lid so as to be integral with and continuous with the rest of the moulded plastic lid.

2. The system according to claim 1, wherein the system further comprises a power source for powering at least one of the emitter, the receiver, the processor and the transmitter; wherein the power source is permanently housed in the package such that the power source is sealed in the package when the moulded plastic lid is formed.

3. The system according to claim 1, wherein the system further comprises a sensor inside the package for detecting a property of the lid.

4. The system according to claim 3, wherein the property is acceleration and/or orientation and/or movement.

5. The system according to claim 2, wherein the package comprises a heat shield for shielding one or more of the emitter, the receiver, the processor, the transmitter and the power source from heat during plastic moulding the package into the lid.

6. The system according to claim 1, wherein the sensor system is sealed in the lid of the container, by a continuous flow of moulded plastic so as to prevent ingress of liquid or particles inside of the package.

7. The system of claim 1, wherein the interpreting the signal is to determine a level of the contents in the container and a type of contents of the container, wherein the type of contents is determined from reflection of pulsed coherent radar.

8. The system according to claim 1, wherein the emitter emits pulsed coherent radar and the processor is configured to determine a type of material inserted into the container based on the reflected radar.

9. The system according to claim 1, wherein the processor is configured to determine a density of the material of a deposited article and/or a thickness and/or spectral characteristic reflective properties based on the received reflected radiation, wherein the received reflected radiation comprises reflected pulsed coherent radar.

10. The system according to claim 8, wherein scanning of the inside of the container is with the pulsed coherent radar such that a shape or a dimension of an article inserted can be determined.

11. The system according to claim 1 further comprising: a processor for using a model to determine an event has occurred in relation to the container, wherein the event is one of: emptying of the container; and tipping over of the container.

12. The system according to claim 11, wherein the model is configured to determine a type of material inserted into the container.

13. The system according to claim 11, wherein the model is used determine a characteristic of an article deposited into the container or a material that the article is made of based on the emitted and reflected radiation being radio frequency radiation.

14. The system according to claim 11, wherein the model applies data available to decide what is being inserted into the container or other event occurring to the container and whether to do something about that event, wherein the event is one of: emptying of the container; and tipping over of the container.

15. The system according to claim 11, the model employs an ongoing learning/artificial intelligence (AI) algorithm learns household one or more of: waste disposal habits, street rubbish disposal habits, event disposal habits.

16. The system of claim 1, wherein the layer of plastic covering the emitter and receiver is a layer of the moulded plastic hinged lid formed in a continuous flow of moulded plastic.

* * * * *